(12) United States Patent
Morinaga et al.

(10) Patent No.: US 9,092,620 B2
(45) Date of Patent: Jul. 28, 2015

(54) MONITORING APPARATUS, CONTROL METHOD, AND COMPUTER-READABLE RECORDING MEDIUM

(75) Inventors: Masanobu Morinaga, Yokohama (JP); Nobuyuki Kanaya, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 278 days.

(21) Appl. No.: 13/568,766

(22) Filed: Aug. 7, 2012

(65) Prior Publication Data

US 2013/0080625 A1 Mar. 28, 2013

(30) Foreign Application Priority Data

Sep. 27, 2011 (JP) ................................. 2011-211653

(51) Int. Cl.
*G06F 15/16* (2006.01)
*G06F 21/55* (2013.01)
*H04L 29/06* (2006.01)
*G06F 9/455* (2006.01)

(52) U.S. Cl.
CPC .......... *G06F 21/552* (2013.01); *H04L 63/1416* (2013.01); *G06F 9/45558* (2013.01); *G06F 2009/45595* (2013.01)

(58) Field of Classification Search
CPC .............. H04L 9/3263; H04L 63/1416; H04L 63/1425; H04L 63/1433
USPC ............. 709/224, 217, 219, 225, 229; 726/22
See application file for complete search history.

(56) References Cited

U.S. PATENT DOCUMENTS

| | | | |
|---|---|---|---|
| 7,448,079 B2 * | 11/2008 | Tremain | 726/14 |
| 8,001,349 B2 * | 8/2011 | Ozaki et al. | 711/163 |
| 2005/0210291 A1 * | 9/2005 | Miyawaki et al. | 713/201 |
| 2006/0037077 A1 * | 2/2006 | Gadde et al. | 726/23 |
| 2009/0144300 A1 * | 6/2009 | Chatley et al. | 707/100 |
| 2011/0208938 A1 * | 8/2011 | Carr et al. | 711/165 |

FOREIGN PATENT DOCUMENTS

JP 2005-269486 9/2005

* cited by examiner

*Primary Examiner* — Frantz Jean
(74) *Attorney, Agent, or Firm* — Staas & Halsey LLP

(57) ABSTRACT

A monitoring apparatus include a memory which stores a program for executing procedures and a processor coupled to the memory and executes the procedures based on the program, wherein the procedures includes detecting a destination of access from a server apparatus to a storage apparatus on the basis of a result of analysis of a packet transmitted and received between the storage apparatus and the server apparatus, the storage apparatus including a plurality of storage areas, the server apparatus executing a plurality of virtual servers, part of the plurality of storage areas being allocated to each of the plurality of virtual servers as an accessible storage area, and determining that abnormal access is performed from the server apparatus to the storage apparatus when the storage areas of the detected destination are beyond a certain criterion in the plurality of storage areas.

15 Claims, 18 Drawing Sheets

Byte/
   |7     6     5     4     3     2     1     0   |
   +-----------------------------------------------+
  0|                    0x28                       |
   +-----------------------------------------------+
  1|    LUN    | DPO | FUA | Reserved  | RelAdr|
   +-----------------------------------------------+
2-5|                    LBA                        |
   +-----------------------------------------------+
  6|                  Reserved                     |
   +-----------------------------------------------+
7-8|              Transfer length                  |
   +-----------------------------------------------+
  9|                  Control                      |
   +-----------------------------------------------+
```

| ITEM NUMBER (511) | VARIABLE (512) | DESCRIPTION (513) |
|---|---|---|
| 1 | IP (Initiator) | IP ADDRESS OF Initiator |
| 2 | IP (Target) | IP ADDRESS OF Target |
| 3 | LUN | VALUE OF LUN |
| 4 | LBA | START VALUE OF LBA |
| 5 | LBA RANGE | LBA Offset |

| ITEM NUMBER | VARIABLE | DESCRIPTION |
|---|---|---|
| 1 | IP (Target) | IP ADDRESS OF Target |
| 2 | TIME | TIME WHEN AREA IS ACCESSED |
| 3 | LUN | VALUE OF LUN |
| 4 | LBA | START VALUE OF LBA |
| 5 | LBA RANGE | LBA Offset |
| 6 | ACCESS COUNT | NUMBER OF TIMES WHEN LBA IS ACCESSED |

| ITEM NUMBER (531) | VARIABLE (532) | DESCRIPTION (533) |
|---|---|---|
| 1 | IP (Target) | IP ADDRESS OF Target |
| 2 | TIME | TIME WHEN AREA IS ACCESSED |
| 3 | LUN | VALUE OF LUN |
| 4 | LBA | START VALUE OF LBA |
| 5 | LBA RANGE | LBA Offset |
| 6 | ACCESS COUNT | NUMBER OF TIMES WHEN LBA IS ACCESSED |
| 7 | WRITING FIELD | WRITING TO CORRESPONDING KEY OCCURS |

MONITORING APPARATUS, CONTROL METHOD, AND COMPUTER-READABLE RECORDING MEDIUM

CROSS-REFERENCE TO RELATED APPLICATION

This application is based upon and claims the benefit of priority of the prior Japanese Patent Application No. 2011-211653, filed on Sep. 27, 2011, the entire contents of which are incorporated herein by reference.

FIELD

The embodiments discussed herein are related to a monitoring apparatus, a control method, and a control program.

BACKGROUND

There are technologies to connect physical servers to storage apparatuses over networks. The technologies include Internet Small Computer System Interface (iSCSI), in which physical servers are coupled to storage apparatuses over Internet Protocol (IP) networks. Network addresses, such as IP addresses, are given to the physical servers and the storage apparatuses coupled over the IP networks on the basis of network devices installed in the physical servers and the storage apparatuses, and the physical servers communicate with the storage apparatuses by using the network addresses.

Multiple virtual machines (VMs) can be run on the physical servers to access the storage apparatuses on the networks in recent years.

Since the network addresses used in the communication are given to the respective network devices. In other words, the network addresses are not given to the respective VMs running on the physical servers. Accordingly, the network addresses allocated to the network devices (e.g. NIC (Network Interface Card)) installed in the physical servers are used in access from the VMs running on the physical servers to the storage apparatuses. In other words, the multiple VMs running on the physical servers may use the same network addresses to access the storage apparatuses.

Since the multiple physical servers access the storage apparatuses over the networks, accessible areas in the storage apparatuses can be restricted for every physical server from the viewpoint of security. However, any physical server can make access beyond the accessible areas that are set in advance due to, for example, faulty or malicious software (such access is hereinafter called unauthorized access). Such unauthorized access can be monitored by capturing packets on the networks. For example, packet capture apparatuses are provided in the networks and source physical servers are identified on the basis of the network addresses included in the packets captured by the packet capture apparatuses to monitor the presence of access to areas outside the accessible areas of the storage apparatuses included in the packets.

However, when the source IP addresses are allocated to the respective network devices (e.g. NIC) installed in the physical servers, as described above, even if the packets are acquired, it may not be determined which VMs running on the physical severs transmits the packets.

Accordingly, it is not possible to determine whether the respective VMs make access to areas outside the allocated areas or within the allocated areas by using the source network addresses.

In other words, in the identification by using the source IP addresses, it is not possible to determine whether the access from the physical servers executing the virtual servers is unauthorized access or authorized access to the storage apparatuses.

Related art is disclosed in, for example, Japanese Laid-open Patent Publication No. 2005-269486.

SUMMARY

According to an aspect of the embodiments, a monitoring apparatus includes a memory which stores a program for executing procedures and a processor coupled to the memory and executes the procedures based on the program, wherein the procedures include detecting a destination of access from a server apparatus to a storage apparatus on the basis of a result of analysis of a packet transmitted and received between the storage apparatus and the server apparatus, the storage apparatus including a plurality of storage areas, the server apparatus executing a plurality of virtual servers, part of the plurality of storage areas being allocated to each of the plurality of virtual servers as an accessible storage area, and determining that abnormal access is performed from the server apparatus to the storage apparatus when the storage areas of the detected destination are beyond a certain criterion in the plurality of storage areas.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 illustrates a format in a Command Descriptor Block (CDB);

FIG. 8 illustrates a specific area information table;

FIG. 9 illustrates an access determination information table;

FIG. 17 illustrates another access determination information table; and

DESCRIPTION OF EMBODIMENTS

Information processing systems according to embodiments will herein be described with reference to the attached drawings.

Figure 1:
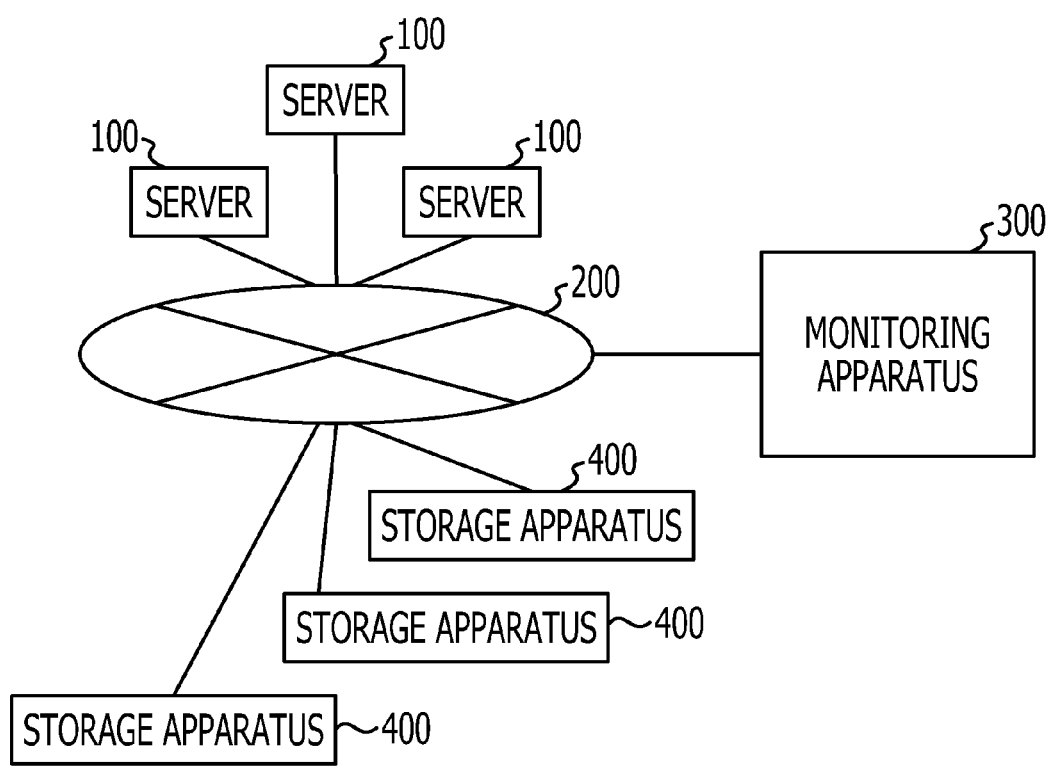
FIG. 1 illustrates an information processing system according to an embodiment.

FIG. 1 illustrates an information processing system according to an embodiment. Referring to FIG. 1, the information processing system includes multiple servers 100, a network 200, a monitoring apparatus 300, and multiple storage apparatuses 400. The multiple servers 100, the monitoring apparatus 300, and the multiple storage apparatuses 400 are coupled to each other over the network 200. Each server 100 executes virtual machines (VMs). The monitoring apparatus 300 monitors the servers 100 and the storage apparatuses 400. Each storage apparatus 400 include multiple disks in which data is stored. The configuration including the servers 100 and the storage apparatuses 400 may be considered as a minimum configuration of the information processing system.

Figure 2:
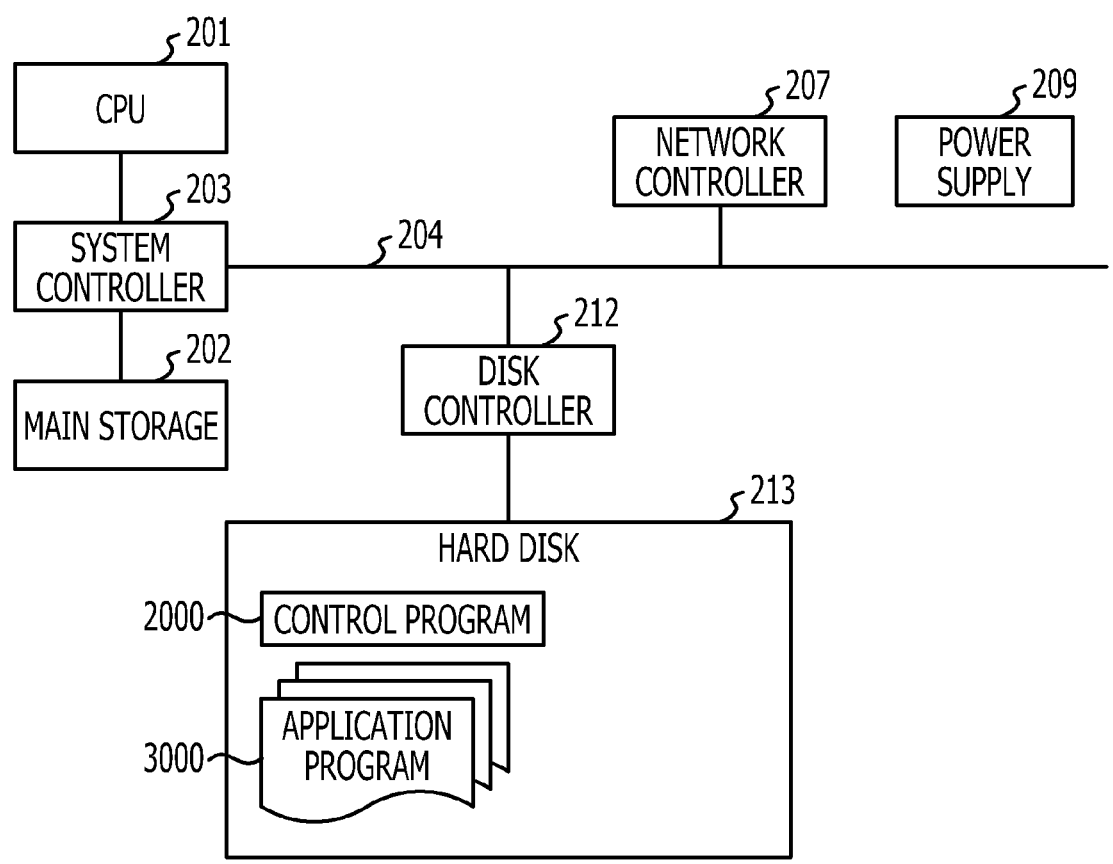
FIG. 2 is a block diagram illustrating a server in the present embodiment illustrated in FIG. 1.

FIG. 2 is a block diagram illustrating the server 100 in the present embodiment illustrated in FIG. 1. Referring to FIG. 2, the server 100 includes a central processing unit (CPU) 201, a main storage 202, a system controller 203, a bus 204, a network controller 207, a power supply 209, a disk controller 212, and a hard disk 213. The server 100 is controlled by the CPU 201.

The system controller 203 is coupled to the CPU 201 and the main storage 202. The system controller 203 controls data transfer between the CPU 201 and the main storage 202 and data transfer between the CPU 201 and the bus 204. The network controller 207 and the disk controller 212 are coupled to the system controller 203 via the bus 204.

At least part of programs in an operating system (OS) executed by the CPU 201 and application programs is temporarily stored in the main storage 202. A variety of data for processing in the CPU 201 is stored in the main storage 202. For example, a random access memory (RAM) is used as the main storage 202.

The hard disk 213 is coupled to the disk controller 212. The disk controller 212 controls the hard disk 213.

The hard disk 213 stores an application program 3000 used by the CPU 201 to execute the VMs on the main storage 202, a control program 2000 used by the CPU 201 to perform control, for example, calling of the application program 3000, and a variety of data.

The network controller 207 is coupled to the other servers 100 and the storage apparatuses 400 illustrated in FIG. 1, and performs transmission and reception of data between the server 100 and the storage apparatuses 400.

The power supply 209 supplies electric power to the hardware in the server 100 via power lines (not illustrated).

The hardware described above realizes the processing function of the server 100.

Figure 3:
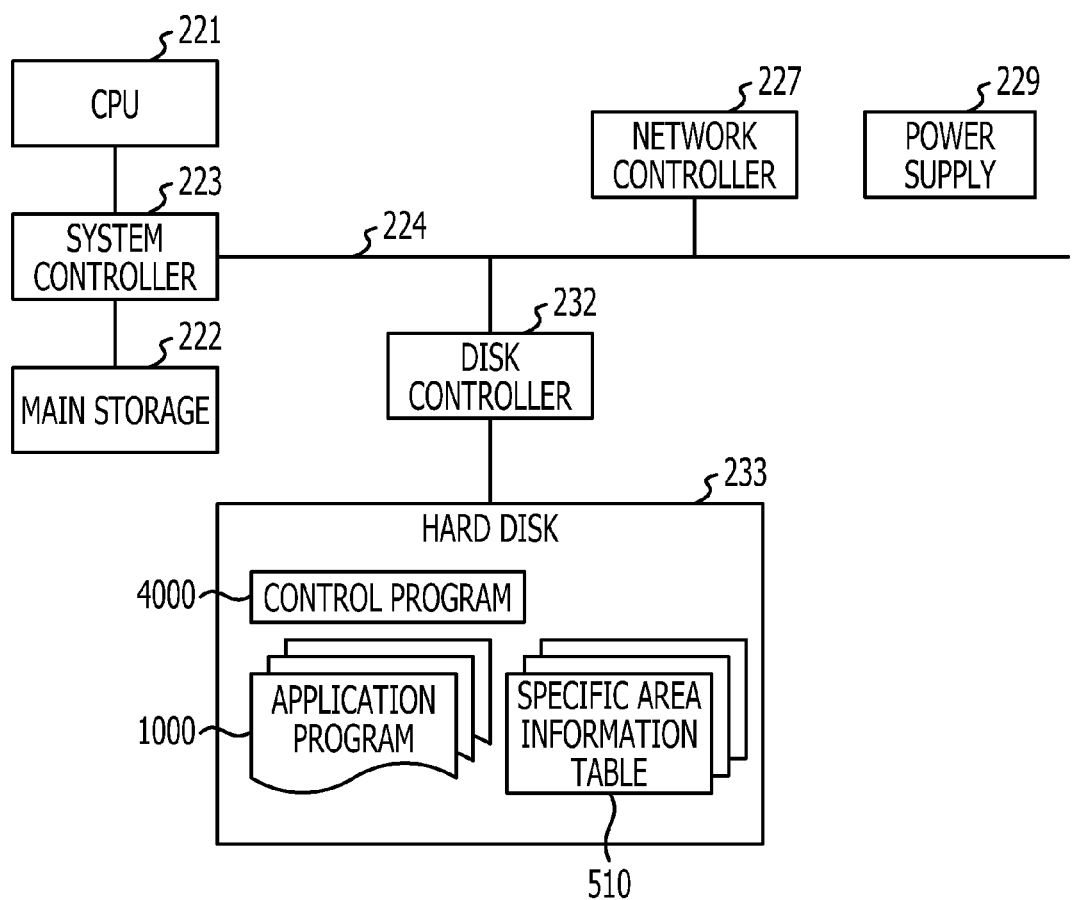
FIG. 3 is a block diagram of a monitoring apparatus in the present embodiment illustrated in FIG. 1.

FIG. 3 is a block diagram of the monitoring apparatus 300 in the present embodiment illustrated in FIG. 1. Referring to FIG. 3, the monitoring apparatus 300 includes a CPU 221, a main storage 222, a system controller 223, a bus 224, a network controller 227, a power supply 229, a disk controller 232, and a hard disk 233. The monitoring apparatus 300 is controlled by the CPU 221.

The system controller 223 is coupled to the CPU 221 and the main storage 222. The system controller 223 controls data transfer between the CPU 221 and the main storage 222 and data transfer between the CPU 221 and the bus 224. The network controller 227 and the disk controller 232 are coupled to the system controller 223 via the bus 224.

At least part of programs in an OS executed by the CPU 221 and application programs is temporarily stored in the main storage 222. A variety of data for processing in the CPU 221 is stored in the main storage 222. For example, a RAM is used as the main storage 222.

The hard disk 233 is coupled to the disk controller 232. The disk controller 232 controls the hard disk 233.

The hard disk 233 stores an application program 1000 executed by the CPU 221 on the main storage 222, a control program 4000 used by the CPU 221 to perform control, for example, calling of the application program 1000, and a variety of data. The hard disk 233 stores, for example, a specific area information table 510. The specific area information table 510 will be described below.

The network controller 227 is coupled to the servers 100 and the storage apparatuses 400 illustrated in FIG. 1 and performs transmission and reception of data between the servers 100 and the storage apparatuses 400.

The power supply 229 supplies electric power to the hardware in the monitoring apparatus 300 via power lines (not illustrated).

The hardware described above realizes the processing function of the monitoring apparatus 300.

Figure 4:
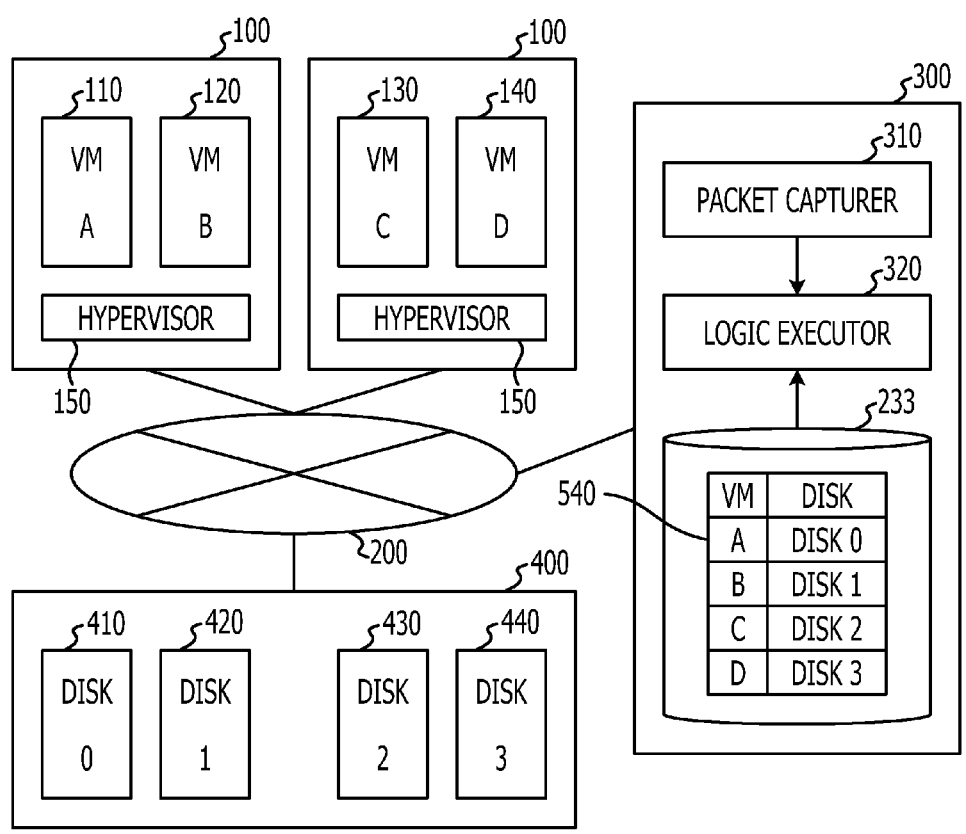
FIG. 4 is a block diagram of the information processing system in the present embodiment illustrated in FIG. 1.

FIG. 4 is a block diagram of the information processing system in the present embodiment illustrated in FIG. 1. The CPU 201 in the server 100 executes the application program 3000 on the main storage 202 to cause the VMs to be executed in the server 100. Referring to FIG. 4, a "VMA" 110 and a "VMB" 120, and a "VMC" 130 and a "VMD" 140 are executed in the respective servers 100. Each server 100 includes a hypervisor 150. The hypervisor 150 manages the VMs and controls input and output.

The storage apparatus 400 includes a "disk 0" 410, a "disk 1" 420, a "disk 2" 430, and a "disk 3" 440. Data is stored in the "disk 0" 410 to the disk 3" 440. The "disk 0" 410 is associated with the "VMA" 110, the disk 1" 420 is associated with the "VMB" 120, the disk 2" 430 is associated with the "VMC" 130, and the disk 3" 440 is associated with the "VMD" 140.

The CPU 221 in the monitoring apparatus 300 executes the application program 1000 on the main storage 222 to execute a packet capturer 310 and a logic executor 320 in the monitoring apparatus 300. The hard disk 233 stores virtual system configuration information 540. The virtual system configuration information 540 indicates the VMs and the disks associated with the VMs. The packet capturer 310 acquires packets transmitted and received between the servers 100 and the storage apparatuses 400 over the network 200. The packet capturer 310 may acquire packets, for example, via a port mirroring of a switch or a tap device. The logic executor 320 performs a variety of processing by referring to an IP address included in each packet to detect unauthorized access to the storage apparatus 400.

Figure 5:
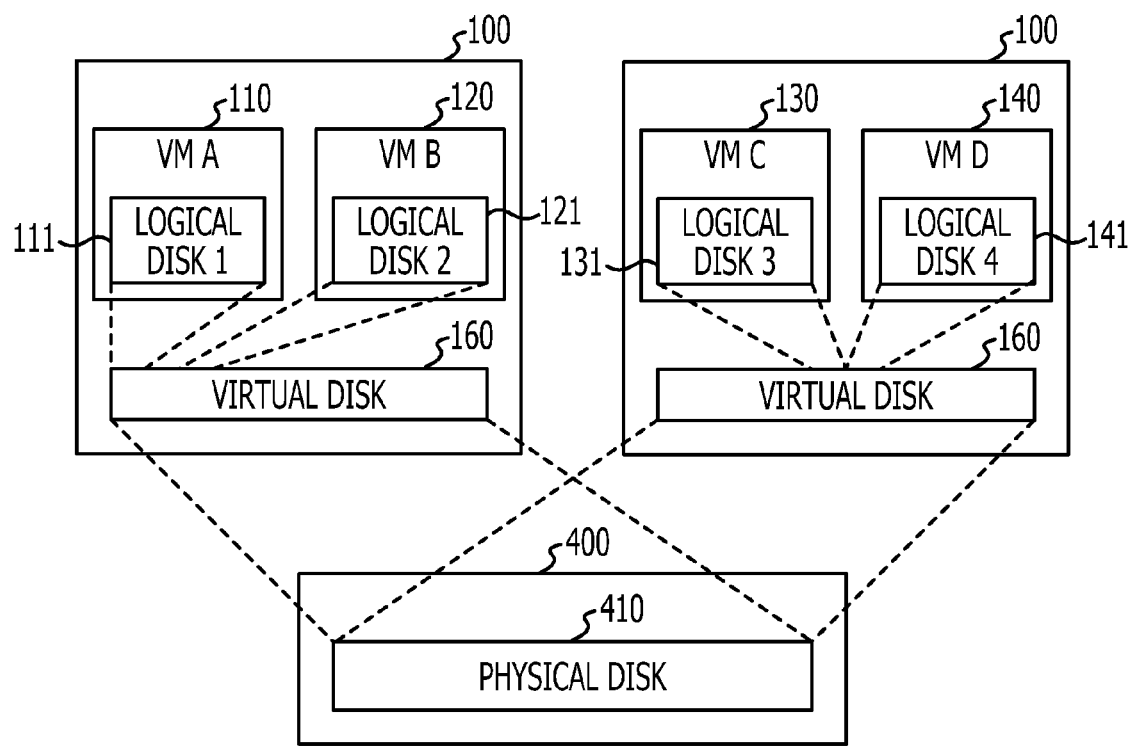
FIG. 5 illustrates an example of the configuration of the information processing system when a storage apparatus is allocated to virtual servers.

FIG. 5 illustrates an example of the configuration of the information processing system when the storage apparatus 400 is allocated to the respective servers 100 and the respective virtual servers (the VMA 110 to the VMD 140) by using the iSCSI.

The physical disk 410 is installed in the storage apparatus 400 (although one physical disk 410 is illustrated in FIG. 5 for convenience, multiple physical disks are actually installed).

Each server 100 includes a virtual disk uniquely associated with the physical disk 410. For example, virtual disks 160 having the same configuration are arranged in the respective servers 100.

A logical disk1 111, a logical disk2 121, a logical disk3 131, and a logical disk4 141 are allocated to the VMA 110, the VMB 120, the VMC 130, and the VMD 140, respectively. The logical disk1 111, the logical disk2 121, the logical disk3 131, and the logical disk4 141 are allocated as areas used to access exclusive areas where the corresponding VMs are not capable of accessing the same area in the virtual disks 160 in the physical servers in which the respective logical disks are installed.

Figure 6:
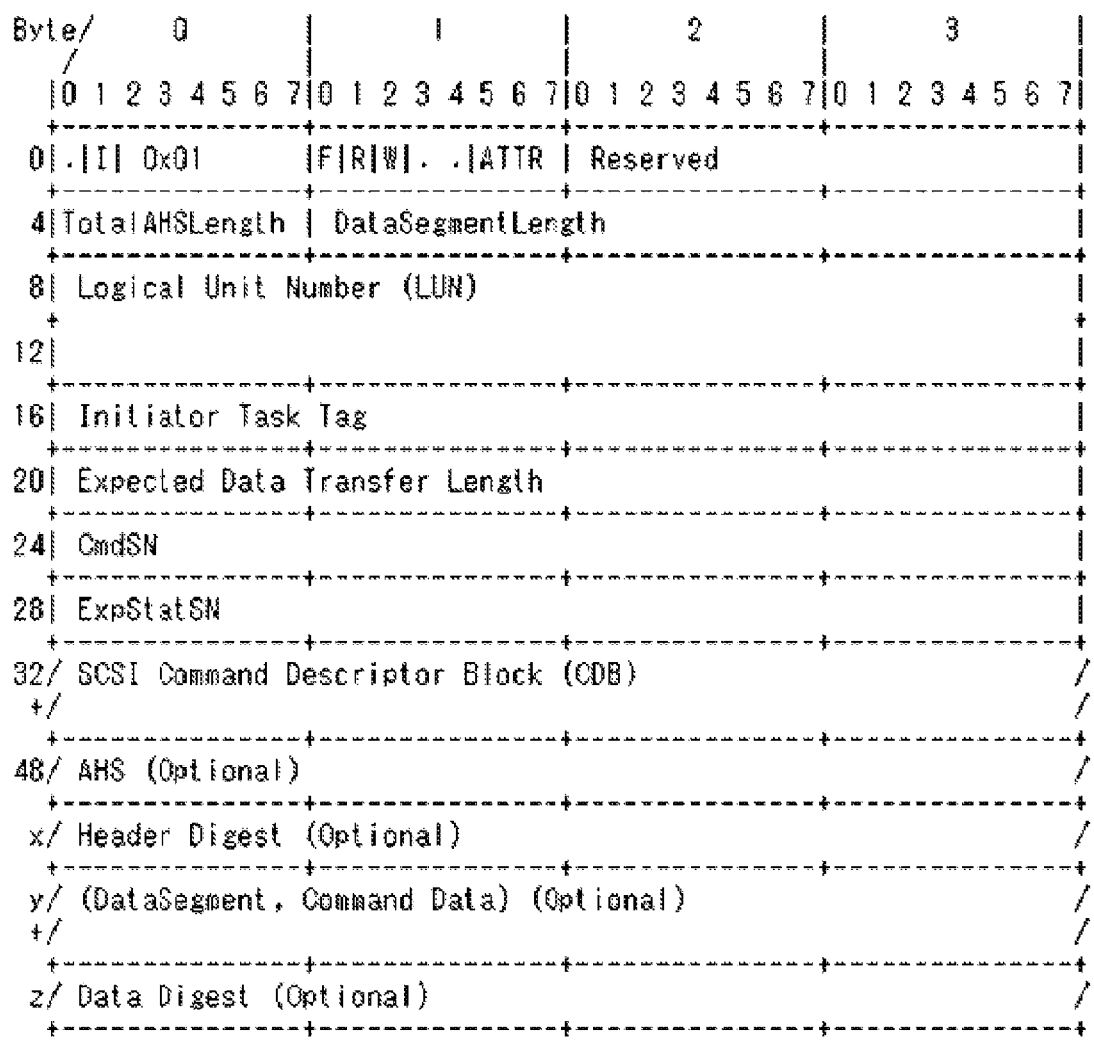
FIG. 6 illustrates an iSCSI command format used to read data in iSCSI.

FIG. 6 illustrates an iSCSI command format 610 used to read data in the iSCSI.

FIG. 7 illustrates a format 620 in a Command Descriptor Block (CDB) when data is read in actual communication between the server 100 and the storage apparatus 400 using the iSCSI.

FIG. 8 illustrates the specific area information table 510. Information indicating a specific area in all the disks of a virtual storage is recorded in the specific area information table 510. The specific area information table 510 includes columns of item number 511, variable 512, and description 513. A variable "IP (initiator)"in an item number "1" indicates the IP address of Initiator. The IP address of Initiator is the IP address of the physical server. A variable "IP (target)" in an item number "2" indicates the IP address of Target. The IP address of Target is the IP address of the storage apparatus 400. A variable "Logical Unit Number (LUN)" in an item number "3" indicates the value of an LUN. The LUN is the number identifying each logical unit resulting from division of the storage apparatus into certain areas. A variable "Logical Block Address (LBA)" in an item number "4" indicates the start value of an LBA. The LBA is the address number identifying each logical block resulting from further division of each certain area and the start value of the LBA indicates the beginning LBA of an area. A variable "LBA range" in an item number "5" indicates Offset of the LBA. The Offset of the LBA indicates the number of logical blocks included in the area. The Offset of the LBA may be set to an arbitrary value. For example, when the Offset of the LBA is set to "10", the certain unit area includes ten logical blocks.

FIG. 9 illustrates an access determination information table 520. Information about access to a certain area is recorded in the access determination information table 520. The access determination information table 520 indicates which physical server accesses which area in the storage apparatus and is generated in association with each physical server. The access determination information table 520 includes columns of item number 521, variable 522, and description 523. A variable "IP (target)" in an item number "1" indicates the IP address of Target. A variable "time" in an item number "2" indicates an access time when a physical server accesses an area in the storage apparatus. The logic executor 320 performs determination of whether the storage apparatus is abnormally accessed when a certain time elapsed since the access time. A variable "LUN" in an item number "3" indicates the value of the LUN of the accessed area. A variable "LBA" in an item number "4" indicates the start value of the LBA of the accessed area. A variable "LBA range" in an item number "5" indicates Offset of the LBA defining the range of the accessed area. A variable "access count" in an item number "6" indicates the number of times when the LBA is accessed.

Figure 10:
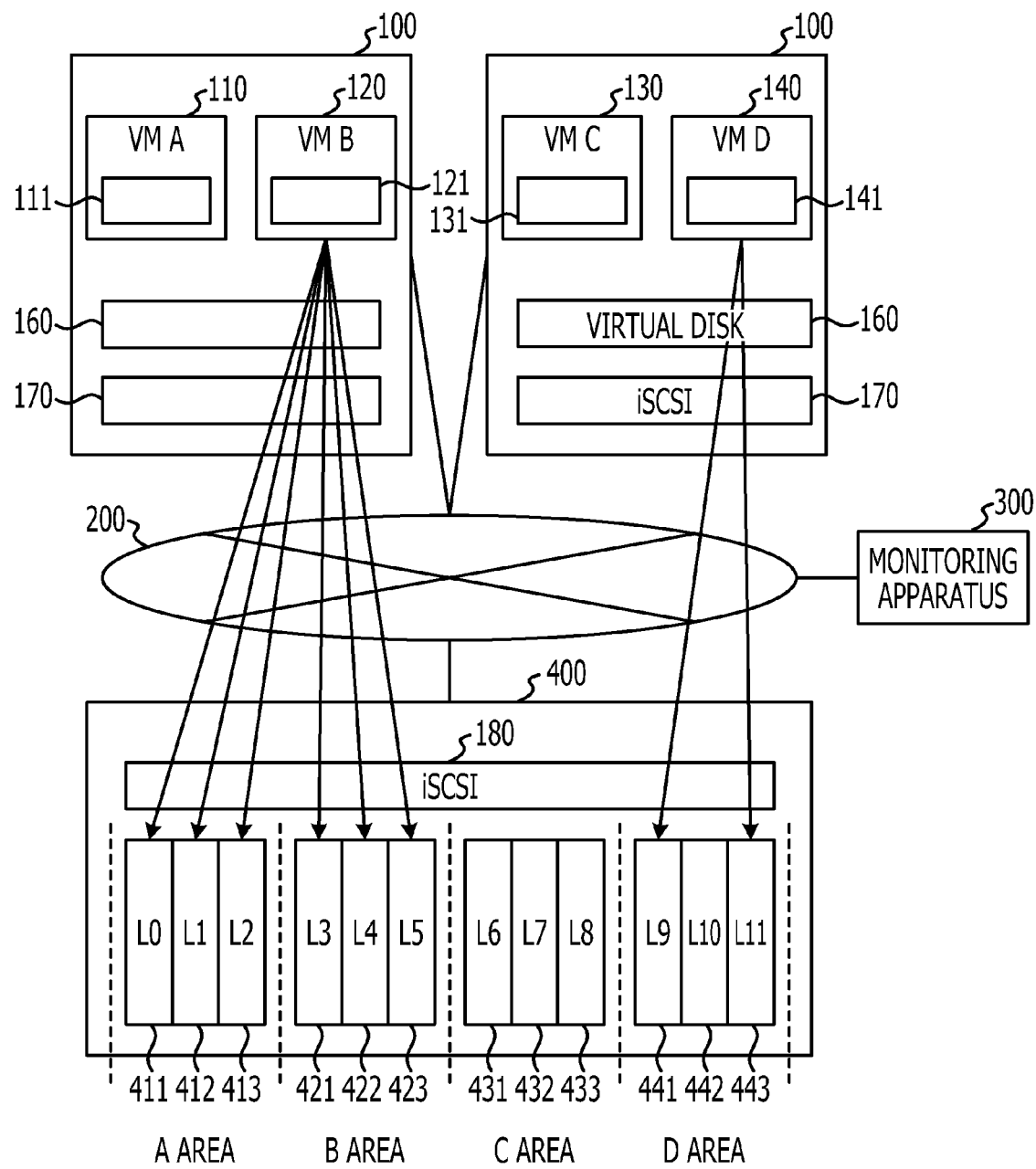
FIG. 10 is a block diagram of an information processing system according to a first embodiment.

FIG. 10 is a block diagram of an information processing system according to a first embodiment. The same reference numerals are used in FIG. 10 to identify the components described above. A description of such component s is omitted herein. In the first embodiment, it is determined that, as in the case of the VMB 120, access to the storage apparatus 400 including areas other than the area allocated to the VMB 120 is abnormal. It is determined that, as in the case of the VMD 140, access to part of the area allocated in the VMD 140 in the storage apparatus 400 is normal.

Referring to FIG. 10, the respective servers 100 execute the VMA 110 and the VMB 120 and the VMC 130 and the VMD 140. The VMA 110 allocates the logical disk 1 111 from the virtual disk 160. The VMB 120 allocates the logical disk 2 121 from the virtual disk 160. The VMC 130 allocates the logical disk 3 131 from the virtual disk 160. The VMD 140 allocates the logical disk 4 141 from the virtual disk 160. Each iSCSI 170 is a storage interface to connect the storage apparatus 400 to the corresponding server 100.

The storage apparatus 400 includes an iSCSI 180, a logical block "L0" 411, a logical block "L1" 412, a logical block "L2" 413, a logical block "L3" 421, a logical block "L4" 422, a logical block "L5" 423, a logical block "L6" 431, a logical block "L7" 432, a logical block "L8" 433, a logical block "L9" 441, a logical block "L10" 442, and a logical block "L11" 443. The logical block "L0" 411 to the logical block "L2" 413 are allocated to the VMA 110. The logical block "L3" 421 to the logical block "L5" 423 are allocated to the VMB 120. The logical block "L6" 431 to the logical block "L8" 433 are allocated to the VMC 130. The logical block "L9" 441 to the logical block "L11" 443 are allocated to the VMD 140. The iSCSI 180 is a storage interface to connect the storage apparatus 400 to each server 100. The logic executor 320 in the monitoring apparatus 300 refers to the IP address of Initiator, the IP address of Target, the LUN, the LBA, and the LBA range included in the packet analyzed by the packet capturer 310 to record the number of each logical block and the access count to the logical block in association with each other in the access determination information table 520 illustrated in FIG. 9.

Figure 11:
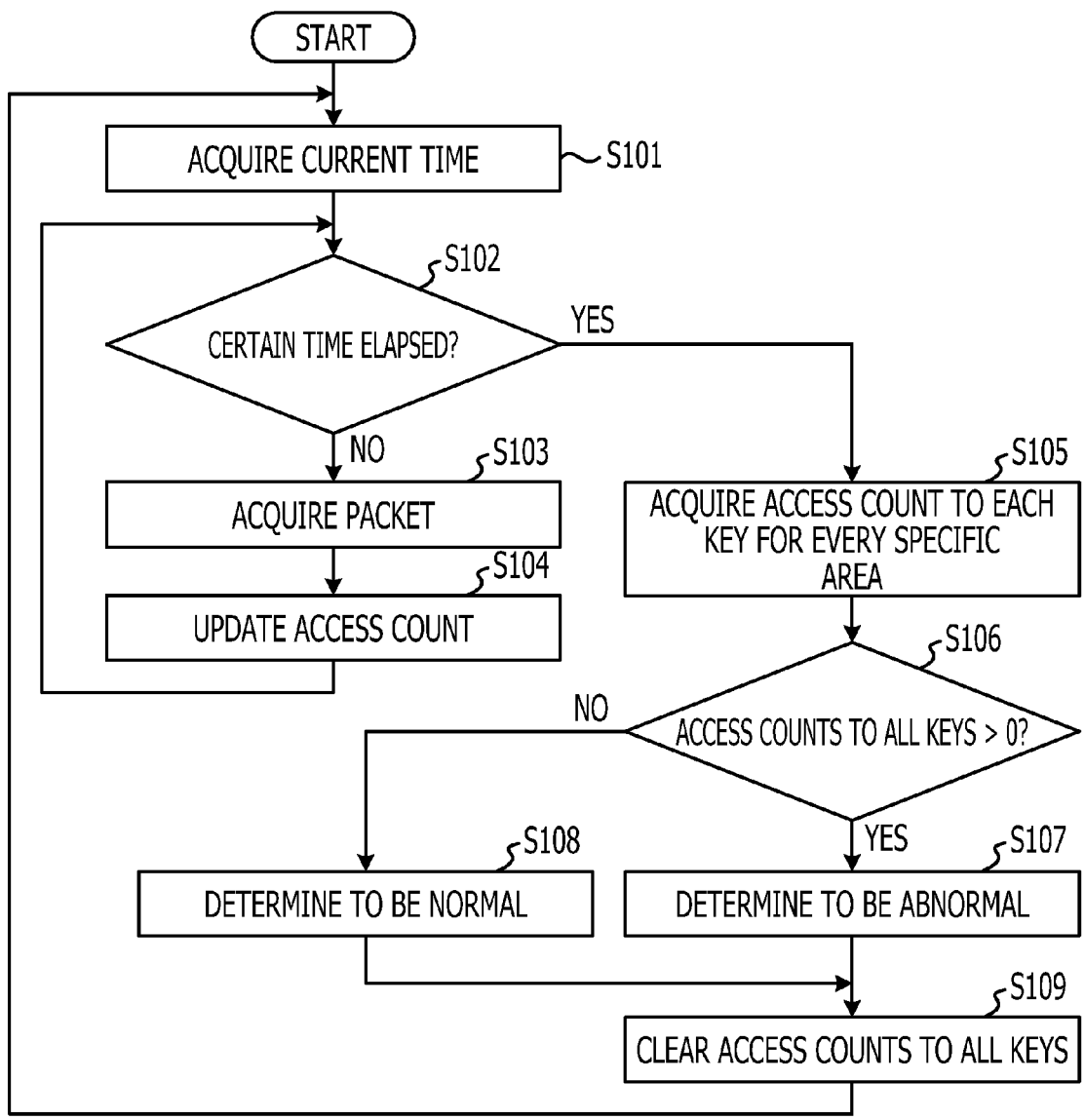
FIG. 11 is a flow chart illustrating a process in a monitoring apparatus in the first embodiment.

FIG. 11 is a flow chart illustrating a process in the monitoring apparatus 300 in the first embodiment.

Referring to FIG. 11, in Step S101, the logic executor 320 acquires the current time. Then, the process goes to Step S102.

In Step S102, the logic executor 320 determines whether a certain time elapsed from the difference between the time acquired in Step S101 and the time when Step S102 was previously performed. If the certain time elapsed (YES in Step S102), the process goes to Step S105. If the certain time did not elapse (NO in Step S102), the process goes to Step S103.

In Step S103, the packet capturer 310 acquires a packet transmitted and received between the server 100 and the storage apparatus 400 over the network 200. Then, the process goes to Step S104.

In Step S104, the logic executor 320 updates the access count to each key for every specific area in the access determination information table 520 corresponding to the source physical server of the packet acquired by the packet capturer 310 on the basis of the IP address of Initiator, the IP address of Target, the LUN, and so on of the packet. The key is an area identified by the three items including the LUN, the LBA, and the LBA range. Then, the process goes back to Step S102.

In Step S105, the logic executor 320 refers to the access determination information table 520 to acquire the access count to each key for every specific area. In the first embodiment, the logic executor 320 uses each logical block as an example of the specific area unit to acquire the access count to each key in the logical block. Then, the process goes to Step S106.

In Step S106, the logic executor 320 determines whether the access counts to all the keys are larger than zero (0). If the access counts to all the keys are larger than zero (YES in Step S106), the process goes to Step S107. If the access counts to all the keys are not larger than zero (NO in Step S106), the process goes to Step S108.

In Step S107, the logic executor 320 determines that the access from the VM to the storage apparatus is abnormal. Then, the process goes to Step S109.

In Step S108, the logic executor 320 determines that the access from the VM to the storage apparatus is normal. Then, the process goes to Step S109.

In Step S109, the logic executor 320 clears the access counts to all the keys. For example, the logic executor 320 sets the access count in the access determination information table 520 to zero. Then, the process goes back to Step S101.

According to the first embodiment, it is determined that the access to the entire specific area in a unit time is abnormal and that the access to part of the specific area in the unit time is normal. This is based on the fact that the normal VM possibly accesses a specific disk area in the unit time but a malicious VM possibly accesses the entire disk area in the unit time. On the basis of the possibility described above, it is determined that the physical servers accessing the entire specific area in the unit time include the VMs performing the unauthorized access.

If it is determined in Step S107 that the access from the VM to the storage apparatus is abnormal, for example, the logic executor 320 may notify a manager that the abnormal access occurs by using an electronic mail or the like. If it is determined in Step S107 that the access from the VM to the storage apparatus is abnormal, for example, the logic executor 320 may output a log indicating the abnormal access.

Figure 12:
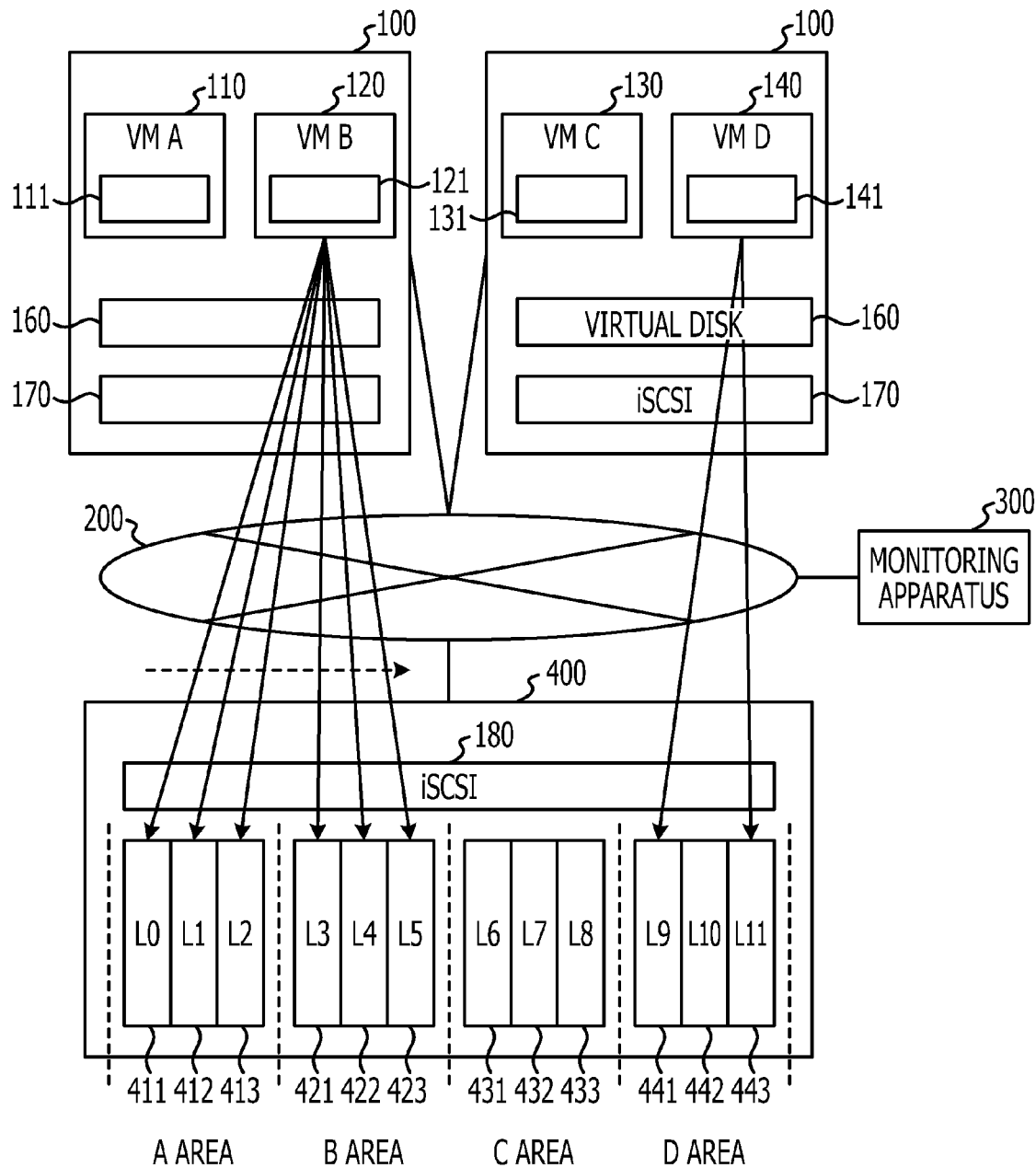
FIG. 12 is a block diagram of an information processing system according to a second embodiment.

FIG. 12 is a block diagram of an information processing system according to a second embodiment. The same reference numerals are used in FIG. 12 to identify the components described above. A description of such component s is omitted herein. In the second embodiment, it is determined that, as in the case of the VMB 120, sequential access to the areas defined by the LBA indicated by Lx (411 to 443) and Offset, including areas other than the area allocated to the VMB 120 in the storage apparatus 400 is abnormal. It is determined that, as in the case of the VMD 140, access to part of the area allocated in the VMD 140 in the storage apparatus 400 is normal.

Figure 13:
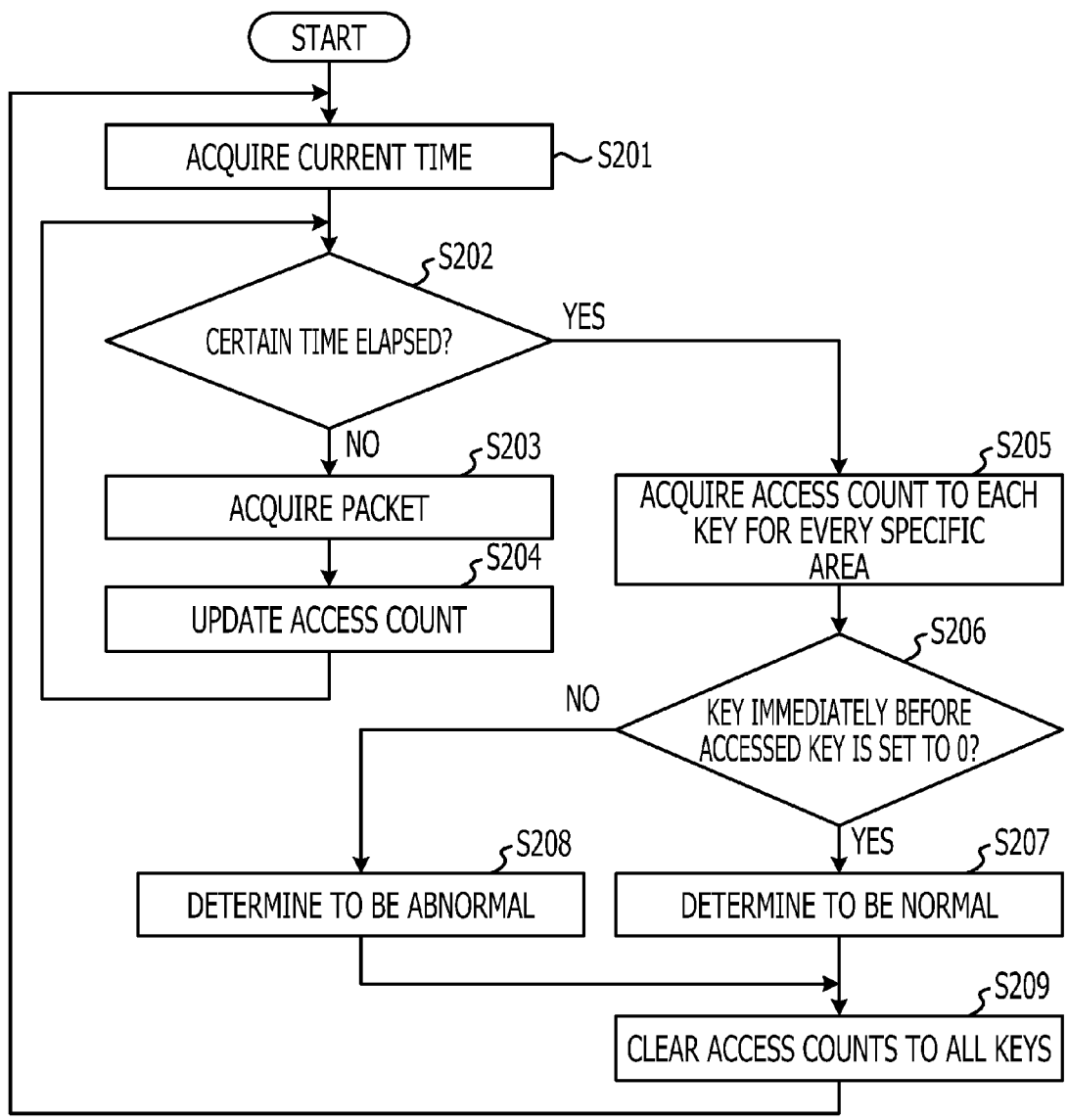
FIG. 13 is a flow chart illustrating a process in a monitoring apparatus in the second embodiment.

FIG. 13 is a flow chart illustrating a process in the monitoring apparatus 300 in the second embodiment.

Referring to FIG. 13, in Step S201, the logic executor 320 acquires the current time. Then, the process goes to Step S202.

In Step S202, the logic executor 320 determines whether a certain time elapsed from the difference between the time acquired in Step S201 and the time when Step S202 was previously performed. If the certain time elapsed (YES in Step S202), the process goes to Step S205. If the certain time did not elapse (NO in Step S202), the process goes to Step S203.

In Step S203, the packet capturer 310 acquires a packet transmitted and received between the server 100 and the storage apparatus 400 over the network 200. Then, the process goes to Step S204.

In Step S204, the logic executor 320 updates the access count to each key for every specific area in the access determination information table 520 corresponding to the source physical server of the packet acquired by the packet capturer 310 on the basis of the IP address of Initiator, the IP address of Target, the LUN, and so on of the packet. Then, the process goes back to Step S202.

In Step S205, the logic executor 320 refers to the access determination information table 520 to acquire the access count to each key for every specific area. In the second embodiment, the logic executor 320 uses each logical block as an example of the specific area unit to acquire the access count to each key in the logical block. Then, the process goes to Step S206.

In Step S206, the logic executor 320 determines whether the key immediately before the accessed key is set zero (0). For example, the logic executor 320 refers to the access determination information table 520 to determine whether the last logical block is accessed. If the key immediately before the accessed key is set to zero (YES in Step S206), the process goes to Step S207. If the key immediately before the accessed key is not set to zero (NO in Step S206), the process goes to Step S208.

In Step S207, the logic executor 320 determines that the access from the VM to the storage apparatus is normal. Then, the process goes to Step S209.

In Step S208, the logic executor 320 determines that the access from the VM to the storage apparatus is abnormal. Then, the process goes to Step S209.

In Step S209, the logic executor 320 initializes the access counts to all the keys to zero to clear the access counts to all the keys. Then, the process goes back to Step S201.

According to the second embodiment, it is determined that the sequential access to the entire specific area from the logical block "L0" to the logical block "L5" is abnormal and that the access to part of the specific area in the unit time is normal. This is based on the fact that, although there is a probability that the entire specific area of the disk is accessed also in the normal access, such an access is possibly redundantly performed at random. In contrast, when a malicious VM accesses the entire specific area, the specific area is possibly sequentially accessed in order to efficiently collect data.

Figure 14:
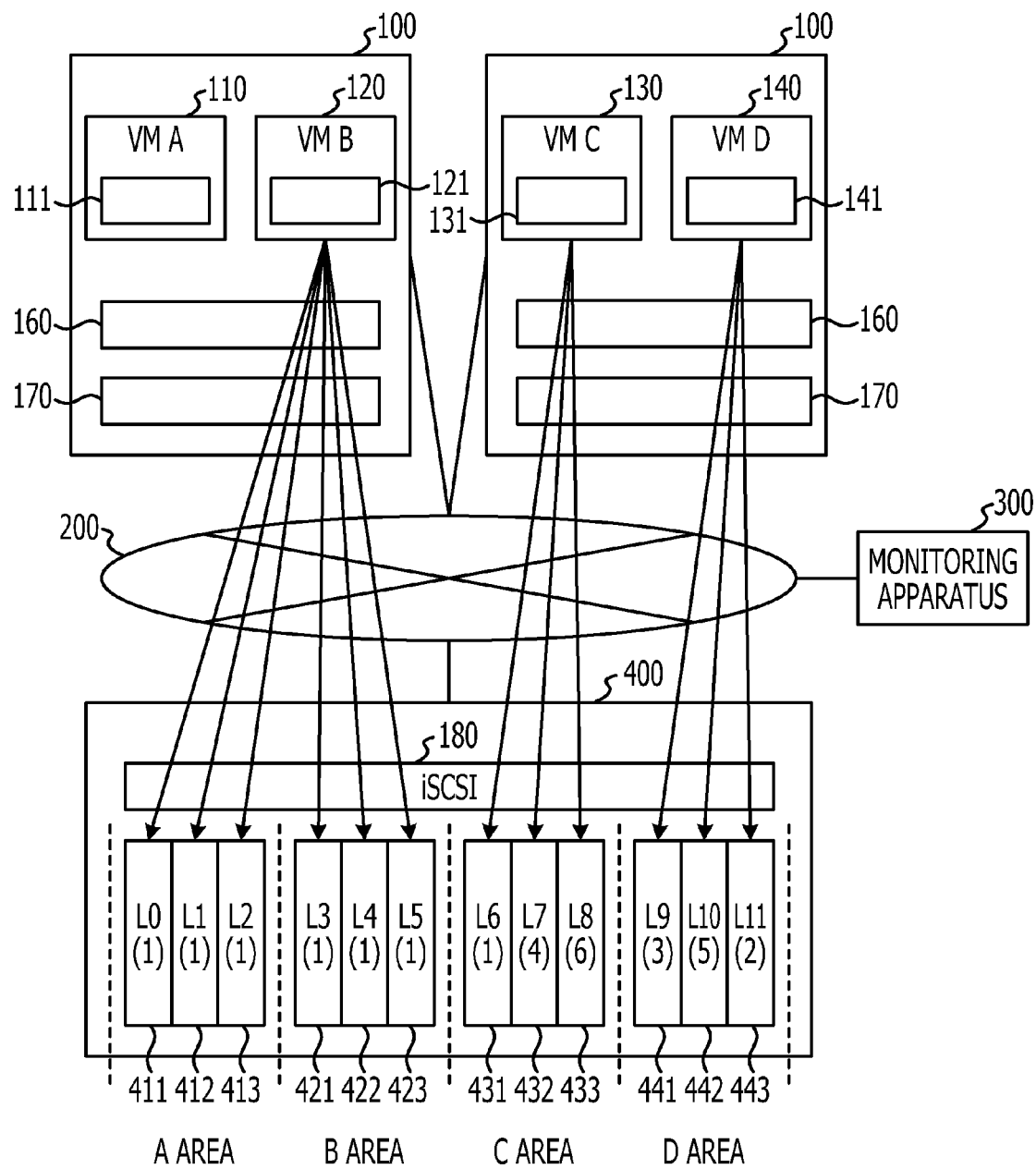
FIG. 14 is a block diagram of an information processing system according to a third embodiment.

FIG. 14 is a block diagram of an information processing system according to a third embodiment. The same reference numerals are used in FIG. 14 to identify the components described above. A description of such component s is omitted herein. Numbers in parentheses added to the logical block "L0" 411 to the logical block "L11" 443 indicate the number of times when the logical blocks are accessed by the server 100 in a certain time. In the third embodiment, it is determined that, as in the case of the logical block "L0" 411 to the logical block "L5" 423, access to the entire specific area at random without redundancy is abnormal. It is determined that, as in the case of the logical block "L6" 431 to the logical block "L11" 443, redundant access to the entire specific area is normal.

Figure 15:
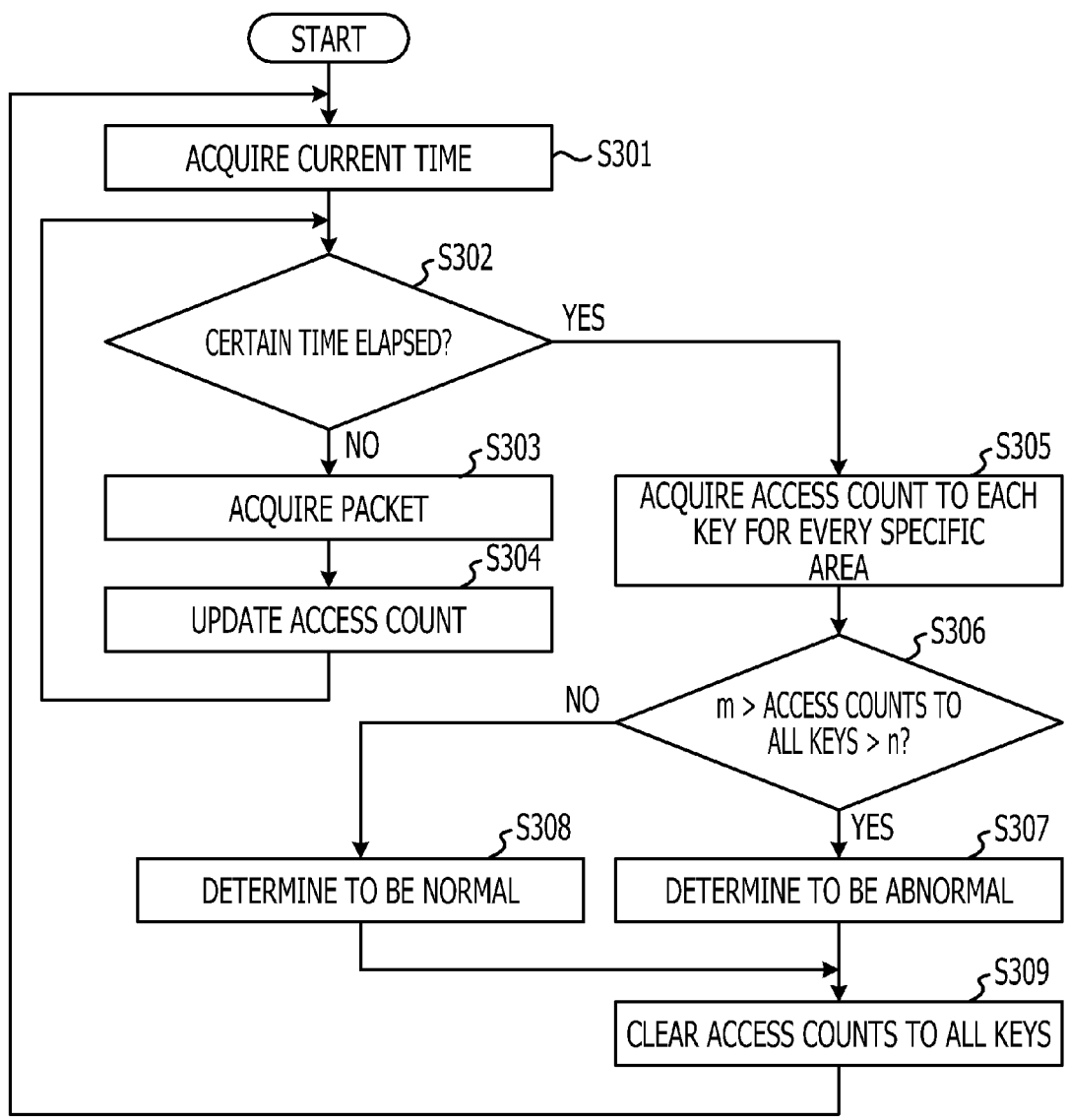
FIG. 15 is a flow chart illustrating a process in a monitoring apparatus in the third embodiment.

FIG. 15 is a flow chart illustrating a process in the monitoring apparatus 300 in the third embodiment.

Referring to FIG. 13, in Step S301, the logic executor 320 acquires the current time. Then, the process goes to Step S302.

In Step S302, the logic executor 320 determines whether a certain time elapsed from the difference between the time acquired in Step S301 and the time when Step S302 was previously performed. If the certain time elapsed (YES in Step S302), the process goes to Step S305. If the certain time did not elapse (NO in Step S302), the process goes to Step S303.

In Step S303, the packet capturer 310 acquires a packet transmitted and received between the server 100 and the storage apparatus 400 over the network 200. Then, the process goes to Step S304.

In Step S304, the logic executor 320 updates the access count to each key for every specific area in the access determination information table 520 corresponding to the source physical server of the packet acquired by the packet capturer 310 on the basis of the IP address of Initiator, the IP address of Target, the LUN, and so on of the packet. Then, the process goes back to Step S302.

In Step S305, the logic executor 320 refers to the access determination information table 520 to acquire the access count to each key for every specific area. In the third embodiment, the logic executor 320 uses each logical block as an example of the specific area unit to acquire the access count to each key in the logical block. Then, the process goes to Step S306.

In Step S306, the logic executor 320 determines whether the access counts to all the keys are larger than n and smaller than m. If the determination condition is met (YES in Step S306), the process goes to Step S307. If the determination condition is not met (NO in Step S306), the process goes to Step S308.

In Step S307, the logic executor 320 determines that the access from the VM to the storage apparatus is abnormal. Then, the process goes to Step S309.

In Step S308, the logic executor 320 determines that the access from the VM to the storage apparatus is normal. Then, the process goes to Step S309.

In Step S309, the logic executor 320 clears the access counts to all the keys. Then, the process goes back to Step S301.

According to the third embodiment, it is determined that the access to the entire specific area at random without redundancy is abnormal and that the redundant access to the entire specific area at random is normal. This is based on the fact that there is a probability that the entire specific area of the disk is accessed also in the normal access. In contrast, when a malicious VM accesses the entire specific area, the specific area is possibly accessed without redundancy in order to efficiently collect data. Arbitrary values meeting the condition "n<m" may be set for m and n used in Step S306.

Figure 16:
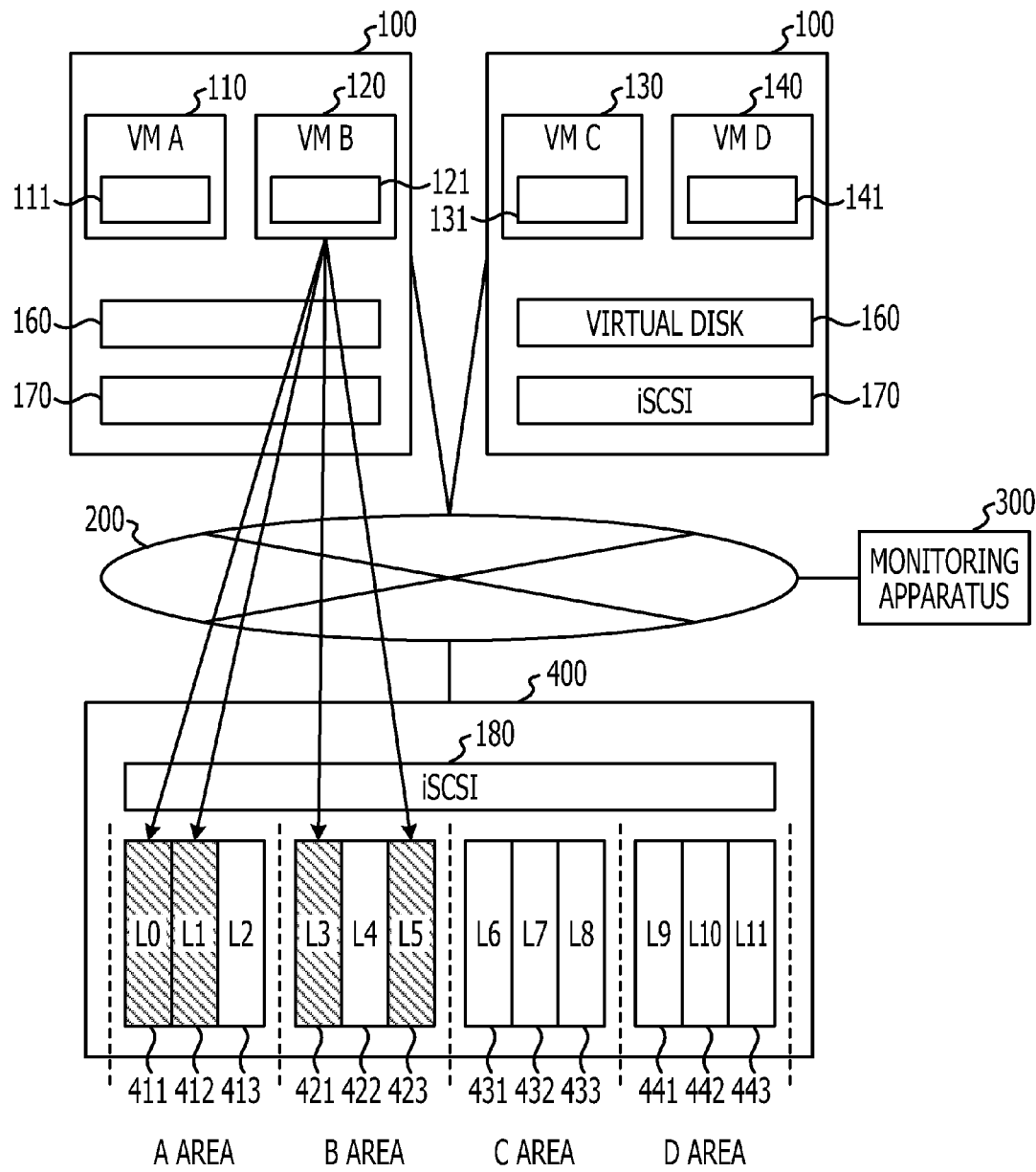
FIG. 16 is a block diagram of an information processing system according to a fourth embodiment.

FIG. 16 is a block diagram of an information processing system according to a fourth embodiment. The same reference numerals are used in FIG. 16 to identify the components described above. A description of such component s is omitted herein. It is assumed in FIG. 16 that data is recorded in the logical block "L0" 411, the logical block "L1" 412, the logical block "L3" 421, and the logical block "L5" 423. In the fourth embodiment, it is determined that access to the logical block "L0" 411, the logical block "L1" 412, the logical block "L3" 421, and/or the logical block "L5" 423 is abnormal.

FIG. 17 illustrates an access determination information table 530. Information about access to a certain area is recorded in the access determination information table 530. The access determination information table 530 includes columns of item number 531, variable 532 and description 533. A variable "IP (target)" in an item number "1" indicates the IP address of Target. A variable "time" in an item number "2" indicates an access time when an area is accessed. The logic executor 320 performs determination of whether the storage apparatus is abnormally accessed when a certain time elapsed since the access time. A variable "LUN" in an item number "3" indicates the value of the LUN of the accessed area. A variable "LBA" in an item number "4" indicates the start value of the LBA of the accessed area. A variable "LBA range" in an item number "5" indicates Offset of the LBA defining the range of the accessed area. A variable "access count" in an item number "6" indicates the number of times when the LBA is accessed. A variable "writing field" in an item number "7" indicates whether writing to the corresponding key occurs. If the logical block "L0" 411, the logical block "L1" 412, the logical block "L3" 421, and/or the logical block "L5" 423 in which the data is recorded is accessed, the logic executor 320 switches the flag of the writing occurrence recording field corresponding to the logical block from "0" to "1."

Figure 18:
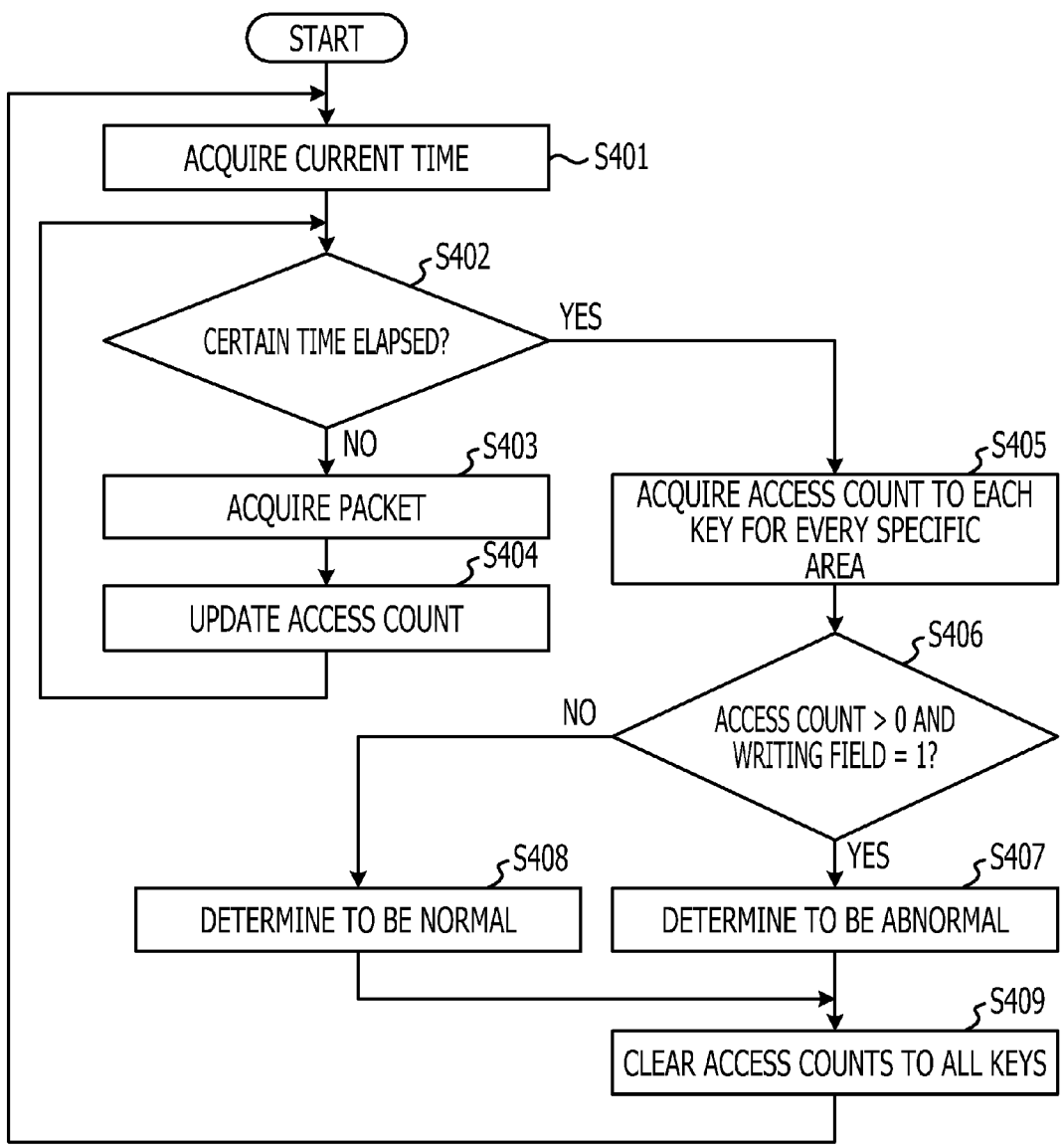
FIG. 18 is a flow chart illustrating a process in a monitoring apparatus in the fourth embodiment.

FIG. 18 is a flow chart illustrating a process in the monitoring apparatus 300 in the fourth embodiment.

Referring to FIG. 18, in Step S401, the logic executor 320 acquires the current time. Then, the process goes to Step S402.

In Step S402, the logic executor 320 determines whether a certain time elapsed from the difference between the time acquired in Step S401 and the time when Step S402 was previously performed. If the certain time elapsed (YES in Step S402), the process goes to Step S405. If the certain time did not elapse (NO in Step S402), the process goes to Step S403.

In Step S403, the packet capturer 310 acquires a packet transmitted and received between the server 100 and the storage apparatus 400 over the network 200. Then, the process goes to Step S404.

In Step S404, the logic executor 320 updates the access count to each key for every specific area in the access determination information table 520 corresponding to the source physical server of the packet acquired by the packet capturer 310 on the basis of the IP address of Initiator, the IP address of Target, the LUN, and so on of the packet. Then, the process goes back to Step S402.

In Step S405, the logic executor 320 refers to the access determination information table 520 to acquire the access count to each key for every specific area. In the fourth embodiment, the logic executor 320 uses each logical block as an example of the specific area unit to acquire the access count to each key in the logical block. Then, the process goes to Step S406.

In Step S406, the logic executor 320 determines whether the access count to the key is larger than zero (0) and the flag of the writing field is set to one (1). If the determination condition is met (YES in Step S406), the process goes to Step S407. If the determination condition is not met (NO in Step S406), the process goes to Step S408.

In Step S407, the logic executor 320 determines that the access from the VM to the storage apparatus is abnormal. Then, the process goes to Step S409.

In Step S408, the logic executor 320 determines that the access from the VM to the storage apparatus is normal. Then, the process goes to Step S409.

In Step S409, the logic executor 320 initializes the access counts to all the keys and the flag of the writing field to zero to clear the access counts to all the keys. Then, the process goes back to Step S401.

The fourth embodiment is based on the fact that, if a malicious VM accesses the disk by using a standard OS command (for example, ls or cp) to attempt file search, the access is made to the areas having data written therein.

According to the first to fourth embodiments described above, the communication pattern of an iSCSI packet is analyzed in the access to the virtual storage and it is determined whether an abnormal behavior occurs in the communication pattern to detect the abnormality in security, thereby detecting the unauthorized access from the VM to the storage apparatus. It is possible to perform the security monitoring that is not dependent on the hypervisor layer by using the external monitoring method by the packet capturing. Owing to the versatility of the external monitoring method, the embodiments are applicable to Information Communication Technology (ICT) systems in multiple virtualized architectures including VMWare and XEN. The embodiments are also applicable to physical host systems using the virtual storages, in addition to the virtual systems using the virtual servers.

According to the above embodiments, it is detected whether the access from the physical server executing the virtual servers is abnormal access.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A monitoring apparatus comprising:
    a memory which stores a program for executing process; and
    a processor coupled to the memory and executes the process based on the program, wherein the process comprise:
    detecting a destination of access from a server apparatus to a storage apparatus on the basis of a result of analysis of a packet transmitted and received between the storage apparatus and the server apparatus, the storage apparatus including a plurality of storage areas, the server apparatus executing a plurality of virtual servers, part of the plurality of storage areas being allocated to each of the plurality of virtual servers as an accessible storage area, each packet transmitted to the storage apparatus being created based on accessing to the storage apparatus by each virtual server and including an address indicating the server apparatus as an initiator with regard to the packet; and
    determining that abnormal access is performed from the server apparatus to the storage apparatus when the storage areas of the detected destination are beyond a certain criterion in the plurality of storage areas.

2. The monitoring apparatus according to claim 1, wherein the process comprise:
    determining that the abnormal access is performed when the access from the server apparatus is performed to the plurality of storage areas in the storage apparatus in a certain order on the basis of the result of the analysis of the packet.

3. The monitoring apparatus according to claim 1,
    wherein the process comprise:
    wherein determining that the abnormal access is performed when the access from the server apparatus is performed to each storage area in the storage apparatus once on the basis of the result of the analysis of the packet.

4. The monitoring apparatus according to claim 1,
    wherein data is stored in the storage areas to which the server apparatus accesses.

5. The monitor apparatus according to claim 1, wherein the server apparatus includes a virtual disk corresponding to a disk in the storage apparatus, and
    each virtual server accesses the virtual disk for accessing the storage apparatus.

6. A method of monitoring an information processing system, the method comprising:
    detecting a destination of access from a server apparatus to a storage apparatus on the basis of a result of analysis of a packet transmitted and received between the storage apparatus and the server apparatus, the storage apparatus including a plurality of storage areas, the server apparatus executing a plurality of virtual servers, part of the plurality of storage areas being allocated to each of the plurality of virtual servers as an accessible storage area, each packet transmitted to the storage apparatus being created based on accessing to the storage apparatus by each virtual server and including an address indicating the server apparatus as an initiator with regard to the packet; and
    determining that abnormal access is performed from the server apparatus to the storage apparatus when the storage areas of the detected destination are beyond a certain criterion in the plurality of storage areas.

7. The method of monitoring an information processing system according to claim 6,
    wherein the abnormal access is performed when that the access from the server apparatus is performed to the plurality of storage areas in the storage apparatus in a certain order on the basis of the result of the analysis of the packet.

8. The method of monitoring an information processing system according to claim 6,
    wherein the abnormal access is performed when the access from the server apparatus is performed to each storage area in the storage apparatus once on the basis of the result of the analysis of the packet.

9. The method of monitoring an information processing system according to claim 6,
    wherein data is stored in the storage areas to which the server apparatus accesses.

10. The method of monitoring an information processing system according to claim 6,
    the server apparatus includes a virtual disk corresponding to a disk in the storage apparatus, and
    each virtual server accesses the virtual disk for accessing the storage apparatus.

11. A non-transitory computer-readable recording medium having stored therein a program for causing a computer to execute a process comprising:
    detecting a destination of access from a server apparatus to a storage apparatus on the basis of a result of analysis of a packet transmitted and received between the storage apparatus and the server apparatus, the storage apparatus including a plurality of storage areas, the server apparatus executing a plurality of virtual servers, part of the plurality of storage areas being allocated to each of the plurality of virtual servers as an accessible storage area, each packet transmitted to the storage apparatus being created based on accessing to the storage apparatus by each virtual server and including an address indicating the server apparatus as an initiator with regard to the packet; and
    determining that abnormal access is performed from the server apparatus to the storage apparatus when the storage areas of the detected destination are beyond a certain criterion in the plurality of storage areas.

12. The non-transitory computer-readable recording medium according to claim 11,
    wherein the process comprises:

determining that the abnormal access is performed when the access from the server apparatus is performed to the plurality of storage areas in the storage apparatus in a certain order on the basis of the result of the analysis of the packet.

13. The non-transitory computer-readable recording medium according to claim 11,
wherein the process comprises:
determining that the abnormal access is performed when the access from the server apparatus is performed to each storage area in the storage apparatus once on the basis of the result of the analysis of the packet.

14. The non-transitory computer-readable recording medium according to claim 11,
wherein data is stored in the storage areas to which the server apparatus accesses.

15. The non-transitory computer-readable recording medium according to claim 11,
the server apparatus includes a virtual disk corresponding to a disk in the storage apparatus, and
each virtual server accesses the virtual disk for accessing the storage apparatus.

\* \* \* \* \*

UNITED STATES PATENT AND TRADEMARK OFFICE
CERTIFICATE OF CORRECTION

| | |
|---|---|
| PATENT NO. | : 9,092,620 B2 |
| APPLICATION NO. | : 13/568766 |
| DATED | : July 28, 2015 |
| INVENTOR(S) | : Morinaga et al. |

Page 1 of 1

It is certified that error appears in the above-identified patent and that said Letters Patent is hereby corrected as shown below:

In the claims

Claim 1, Column 11, Line 27

Delete "executing" and insert --executing a--, therefor.

Claim 5, Column 11, Line 65

Delete "monitor" and insert --monitoring--, therefor.

Signed and Sealed this
Eighth Day of December, 2015

Michelle K. Lee
*Director of the United States Patent and Trademark Office*